United States Patent [19]

Martin

[11] 3,748,696

[45] July 31, 1973

[54] FASTENER

[76] Inventor: Macklin F. Martin, 6015 Herzog St., Oakland, Calif.

[22] Filed: Jan. 19, 1972

[21] Appl. No.: 218,942

[52] U.S. Cl. ............. 24/16 PB, 24/150 FP, 40/302
[51] Int. Cl. .................. B65d 63/00, A44b 9/00
[58] Field of Search .................. 24/90 PR, 16 PB, 24/73 PB, 90 F, 103, 90 W, 206 A, 90 TS, 208 A, 150 FP, 73 HS; 40/21 C, 22, 23 R, 301, 302; 85/5 R; 292/317, 320, 321, 322, 325

[56] References Cited
UNITED STATES PATENTS

| | | | |
|---|---|---|---|
| 1,998,791 | 4/1935 | Schanz | 24/208 A UX |
| 2,104,885 | 1/1938 | Robbins | 24/90 PR |
| 2,610,879 | 9/1952 | Pope | 248/74 PB UX |
| 2,681,488 | 6/1954 | Ferrajolo | 24/90 TS |
| 3,595,506 | 7/1971 | Saunders | 248/74 PB X |
| 3,600,027 | 8/1971 | Noland | 292/322 |

FOREIGN PATENTS OR APPLICATIONS

| | | | |
|---|---|---|---|
| 11,957 | 5/1903 | Austria | 1/40 |
| 1,332,688 | 6/1963 | France | 24/208 A |

Primary Examiner—Donald A. Griffin
Attorney—Carlisle M. Moore

[57] ABSTRACT

A plastic fastener for joining objects together wherein a bolt member has a sharpened shank which pierces the object to be joined and normally outwardly projecting but inwardly flexible anchor members formed integrally on the shank to engage shoulders on a nut member. After the bolt pierces the object, the nut is forced axially onto the bolt shank, flexing the anchor members inwardly, the anchor members then springing out into engagement with internal shoulders in the bore of the nut to hold the nut onto the bolt.

3 Claims, 3 Drawing Figures

PATENTED JUL 31 1973 3,748,696
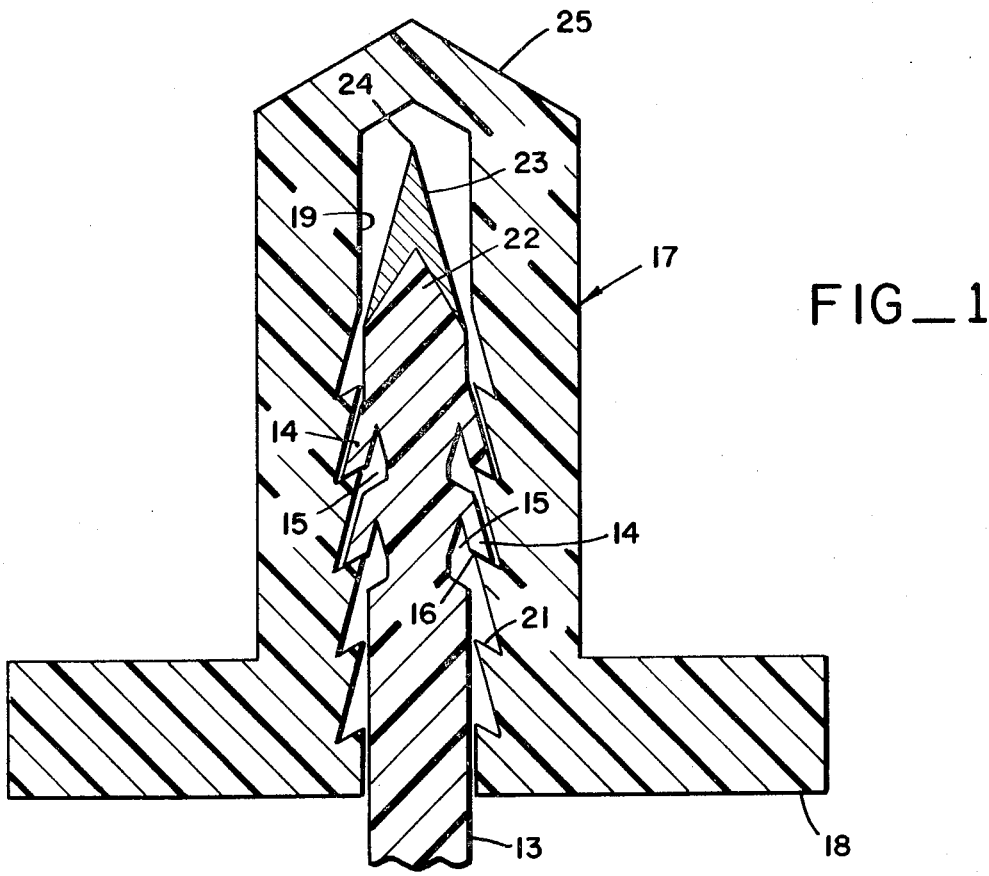
FIG_1
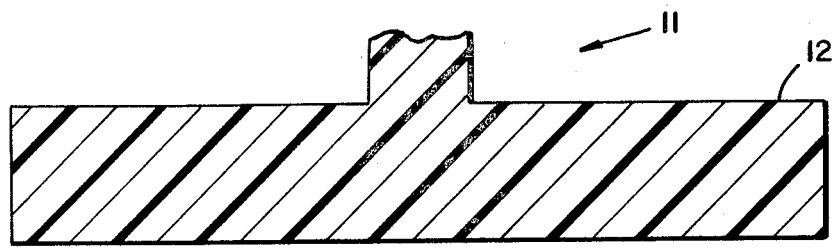
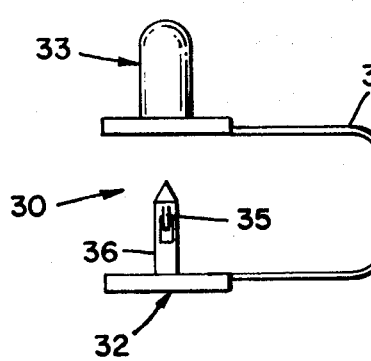
FIG_2
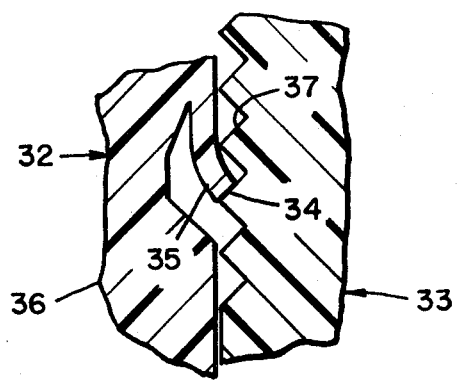
FIG_3

FASTENER

BACKGROUND AND SUMMARY OF THE INVENTION

Applicant has spent considerable time in investigating ways in which discarded tire carcasses may be joined together to form structural objects which may be used in fresh or salt water environments for water control. Such materials and uses place severe limitations on fasteners which can be used. In particular, salt water usage requires a fastener which will not corrode and rust through when exposed to salt water. As such, the relatively inexpensive metals such as iron and many steels are ruled out. Since it is desired to make normally undesirable tire carcasses useful in lieu of more conventional building materials, the fasteners must be as inexpensive as possible, which dictates against the use of the more expensive metals that will not corrode in salt water environments. In addition, such fasteners must be simple to use, with a minimum of tools, and must form a secure fastening.

Applicant has been unable to find a suitable fastener for his purposes, and the present invention is the result of such lack.

Applicant has devised a two-part fastener, preferably made of plastic so it will not corrode in a salt water environment. One part is a bolt member, sharpened at the end to pierce the objects to be joined and having outwardly projecting and inwardly flexible anchor members on it, and the other is a nut member which fits onto the bolt by non-rotative movement, the bolt having grooves to engage the anchor members and hold the parts against disengagement. For large-size fasteners, only a hammer is necessary to secure the fastener parts together.

When the parts are secured together, they cannot be taken apart without destruction of the fastener. As a consequence, the present fastener, when reduced to a smaller scale, can be used for a variety of purposes where it is desired to lock or seal objects together temporarily to provide a readily detectable means of indicating whether the lock has been broken. One particular use would be in the garment industry wherein price tags are temporarily attached to garments. Often customers will switch price tags, putting a cheaper tag on a higher-priced garment. If the salesman is unaware of the change, the customer's cheating may be undetected. However, if the price tag cannot be removed without destruction of the fastener, such switching will be deterred and can be easily detected if it does occur. Similarly, many times a person will desire to lock a drawer or a brief case to prevent its being opened without his knowledge. The present fastener provides an inexpensive expendable item for these purposes.

In addition, since the two parts of the fasteners are made of plastic, and preferably formed by injection molding, a connecting strip may be molded at the same time so that the bolt and nut are secured to each other, thereby preventing loss of one part or the other before the fastener is used. The non-rotative securement of the parts enables the bolt and nut to be coupled together without removal of the connecting strip.

Other objects and advantages will become apparent in the course of the following detailed description.

BRIEF DESCRIPTION OF THE DRAWINGS

In the drawings, forming a part of this application and in which like parts are designated by like reference numerals throughout the same, FIG. 1 is a sectional view of the nut and bolt portions of the present fastener;

FIG. 2 is a view of the nut and bolt prior to their being secured together and illustrating the manner in which they may be molded with an integral connecting strip;

FIG. 3 is a sectional detail of a modification of the invention.

DESCRIPTION OF THE PREFERRED EMBODIMENT

Referring now to FIG. 1, the fastener 10 comprises a bolt member 11 having a radially enlarged head 12 and a shank 13 extending centrally therefrom. The shank is formed with longitudinal anchor members 14 which are integral at their upper ends with the shank. The lower ends of the anchor members are formed during molding so that they normally project outwardly from the perimeter of the shank. Pockets 15 are formed in the shank underneath the anchor members so that the anchor members may flex thereinto. Preferably the bottom surfaces 16 of the anchor members 14 are sloped downwardly and outwardly.

Two sets of longitudinally spaced anchor members 14 are shown in FIG. 1. If desired, only one set could be used, but two sets will provide a greater holding force. Also, if desired, three sets of anchor members 14 could be used. This would enable each anchor member to be made smaller and/or thinner so as to increase the flexibility thereof and also to increase the useful cross-sectional area of the shank. However, the greater the number of sets of longitudinal anchor members, the longer must be the bolt shank and the nut bore.

Fastener 10 also includes a nut member 17 having a radially enlarged flange 18 and a central bore 19, the bore being formed with a plurality of annular, longitudinally spaced grooves 20 having shoulders 21 shaped complementary to the bottom surfaces 16 of the anchor members 14.

Preferably the bolt 11 and nut 17 are formed, as by injection molding, from a plastic material, such as nylon, which is not corrodable in salt water.

Although the nylon material of bolt shank 13 can be formed with a relatively hard sharpened end 22, the bolt shank 13 may be provided with a conical metal end cap 23 having a very sharp pointed end 24 thereon. Such an end cap 23 will facilitate the driving of the bolt shank through objects, such as rubber tire carcasses, that are to be joined together. The end cap 23 may also be mounted on the bolt shank 13 so that it may be removed and reused on other bolts once the shank has been driven through the objects to be joined.

The nut 17 may be formed, if desired, with an integral end closure 25 at the end of bore 19 to protect the user against contact with the sharpened end of the bolt shank when the fastener parts are secured together.

In the use of the described fastener, the bolt sharpened end of the bolt member is positioned against the objects to be secured and is then driven through the objects. If the objects are tough, as will be the case if tire carcasses are to be joined, a hammer blow on the bolt head will probably be required to cause the shank to pierce the carcasses. With the bolt in place, the nut is then forced onto the end of the shank. Again for large fasteners, a hammer blow on the end of the nut may be necessary to drive the nut home. As the nut passes down the bolt shank, the anchor members 14 will flex inwardly into the shank pockets 15, so that the anchor members ratchet past the nut grooves. When the nut has been pushed as far as it will go, the lower ends of the anchor members will flex outwardly into the adjacent grooves in the nut bore.

If a disengaging axial force is applied to the nut and bolt, the shape of the lower anchor surfaces 16 and the complementary nut shoulders will cam the anchor finger slightly outwardly into the grooves to increase the holding strength. Rotation of the nut relative to the nut shank will not disengage the fastener since the nut shoulders 21 are circular, rather than helical. As a consequence, rotation of the objects secured together will not cause disengagement of the fastener.

If desired, the nut shoulders and bolt anchor members could be made helically so that a relative rotation would enable the parts to be engaged. However, normally the nut will be made with circular grooves so that disengagement can only occur if the shank is sawn apart or if sufficient axial force be applied to the parts to shear off the anchor members.

As will be noted from the drawings, the sharpened metal end cap 23 does not serve to hold the fastener parts together when they are assembled. Thus, the end cap 23 may be made of a material that will corrode in salt water and left in place when the fastener parts are coupled toglether without weakening the fasteners as the end cap corrodes.

FIG. 2 illustrates a small version 30 of the fastener in which a plastic connecting strip 31 is formed integral with and between the bolt and nut parts 32 and 33 as the latter are formed in an injection mold. Such connecting strip 31 is very advantageous in that the fasteners can be easily packaged without fear that there will be an unequal number of nuts and bolts. The same is true when the fasteners are used in that the integral connection will prevent the nut from being lost. In many uses of the fasteners, the bolt shank will piece two objects, such as a garment and a price tag, at a distance from the edges thereof less than half the length of the connecting strip. After the bolt is in place, the nut is simply pressed onto the shank to secure the fastener parts together. Since the nut moves only axially and non-rotatively onto the bolt shank, it is not necessary to remove the connecting strip. If the fastener is to be positioned relatively far from the edge of the objects, the connecting strip can be simply cut, as by scissors.

Once the fastener parts are secured, the nut cannot be removed from the bolt except by severing of the shank or by stripping of the shank anchors. Such disengagement can be easily accomplished, when desired, but the consequent destruction of the fastener prevents surreptitious disengagement and reuse thereof.

When the fastener is designed for light temporary locking or sealing purposes, it is not necessary that the fastener have a great amount of axial strength. As a consequence, the bolt anchor members and nut member grooves may be formed, as in FIG. 3, wherein there is a relatively small amount of interengaging contact between them when the parts are locked together. As will be noted in FIG. 3, the lower surface 34 of anchor member 35 on the shank 36 of bolt 31 has a relatively small area in contact with the shoulder 37 of nut 33. The anchor surface 34 and shoulder 37 slope upwardly and outwardly, which facilitates the molding while providing sufficient axial strength in the fasteners when the parts are secured together.

Having thus described my invention, I claim:

1. A fastener comprising:
   a. a bolt member having an enlarged radial head and a solid, stiff shank member extending centrally therefrom, said shank member having a uniform diameter throughout its length, said shank member then terminating in a sharpened end,
   b. said shank member having at least one anchor member formed integrally therewith, said anchor member starting from the surface of said shank member at a point spaced from said sharpened end so that said shank has a cylindrical surface between said point and said sharpened end, said anchor member extending towards said head and having a free end normally positioned radially outwardly beyond the perimeter of said shank, said shank member having a pocket formed in the surface thereof to enable said anchor member to flex laterally thereinto, and said anchor member having sufficient lateral resilience to enable it to flex into said pocket,
   c. a nut member having an enlarged radial flange and a central bore thereinto, said bore in cross section having approximatley the same size and shape as the cross section of said shank, said nut having at least one shoulder formed into the surface of said central bore for abutting engagement with the free end of said anchor member when said free end thereof projects radially outwardly beyond the perimeter of said shank.

2. A fastener as set forth in claim 1 wherein said bolt member and said nut member are both formed of plastic material.

3. A fastener as set forth in claim 2, and further including a metal end cap removably mounted on the end of said shank, said end cap having an inner surface complementary to the sharpened end of said shank member and a conical outer surface, the diameter of the base of said conical outer surface being equal to the diameter of said cylindrical surface of said shank member and said conical outer surface of said end cap terminating at its apex in a sharpened point, the apex angle of said end cap being less than the corresponding angle of the end of said shank member.

* * * * *